(12) United States Patent
Kobayashi et al.

(10) Patent No.: US 11,400,399 B2
(45) Date of Patent: Aug. 2, 2022

(54) FILTER, METAL ION REMOVING METHOD, AND METAL ION REMOVING APPARATUS

(71) Applicant: 3M INNOVATIVE PROPERTIES COMPANY, St. Paul, MN (US)

(72) Inventors: Mitsuaki Kobayashi, Tokyo (JP); Yukihisa Okada, Tokyo (JP); Takaaki Shirai, Tokyo (JP); Hideyuki Okada, Kanagawa (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 97 days.

(21) Appl. No.: 16/769,451

(22) PCT Filed: Jan. 3, 2019

(86) PCT No.: PCT/IB2019/050060
§ 371 (c)(1),
(2) Date: Jun. 3, 2020

(87) PCT Pub. No.: WO2019/138305
PCT Pub. Date: Jul. 18, 2019

(65) Prior Publication Data
US 2021/0187422 A1 Jun. 24, 2021

(30) Foreign Application Priority Data
Jan. 9, 2018 (JP) .............................. JP2018-001318

(51) Int. Cl.
*B01J 39/05* (2017.01)
*B01D 39/16* (2006.01)
(Continued)

(52) U.S. Cl.
CPC .......... *B01D 39/1661* (2013.01); *B01J 39/05* (2017.01); *B01J 41/07* (2017.01); *B01J 45/00* (2013.01);
(Continued)

(58) Field of Classification Search
None
See application file for complete search history.

(56) References Cited

U.S. PATENT DOCUMENTS 5,972,293 A * 10/1999 Kim .................... B01D 65/022
422/28
6,375,850 B1 4/2002 Deacon
(Continued)

FOREIGN PATENT DOCUMENTS

| EP | 1 437 376 | 7/2004 |
| JP | 59-183887 | 10/1984 |

(Continued)

OTHER PUBLICATIONS

International Search Report for PCT/IB2019/050060 dated Mar. 5, 2019 (3 pages).

*Primary Examiner* — Chester T Barry
(74) *Attorney, Agent, or Firm* — 3m Innovative Properties Company

(57) ABSTRACT

A filter includes a porous molding, the porous molding being a sintered product of mixed powder containing dry gel powder including an ion exchange resin and thermoplastic resin powder, or a swelled body of the sintered product. When water having an electric resistivity value of 18 MΩ·cm or more is allowed to pass through a space velocity of 1200 hr−1, the electric resistivity value of water after passage is 15 MΩ·cm or more. To provide a filter that can efficiently remove metal ions in a solution to be treated, and easily acquire a solution having an extremely low content of metal ions.

7 Claims, 3 Drawing Sheets

(51) Int. Cl.
   *B01J 47/018*   (2017.01)
   *B01J 41/07*    (2017.01)
   *B01J 45/00*    (2006.01)
(52) U.S. Cl.
   CPC ..... *B01J 47/018* (2017.01); *B01D 2239/0291* (2013.01); *B01D 2239/0407* (2013.01); *B01D 2239/1291* (2013.01)

(56) References Cited

U.S. PATENT DOCUMENTS

2004/0238152 A1*  12/2004  Campomanes ......... B22C 9/046
                                                 164/358
2010/0203335 A1*   8/2010  Koizumi ............... C08L 51/003
                                                 428/402

FOREIGN PATENT DOCUMENTS

| JP | 2005/213200 | 8/2005 |
| JP | 4220832 B2 | 11/2008 |
| WO | WO 1996/20965 | 7/1996 |
| WO | WO 2001/037995 | 5/2001 |

* cited by examiner

FILTER, METAL ION REMOVING METHOD, AND METAL ION REMOVING APPARATUS

CROSS REFERENCE TO RELATED APPLICATIONS

This application is a national stage filing under 35 U.S.C. 371 of PCT/IB2019/050060, filed Jan. 3, 2019, which claims the benefit of JP Patent Application No. 2018-001318, filed Jan. 9, 2018, the disclosures of which are incorporated by reference in their entirety herein.

TECHNICAL FIELD

The present invention relates to a filter, a metal ion removing method, and a metal ion removing apparatus.

BACKGROUND ART

A solution having a low content of metal ions has been long demanded as a solution used to manufacture electronic parts such as integrated circuits. For example, Patent Document 1 describes an apparatus for reducing the metal content in a surfactant to ppb levels enough to be usable in high-performance semiconductor materials.

PRIOR ART DOCUMENTS

Patent Documents

Patent Document 1: JP-A-2005-213200

SUMMARY OF THE INVENTION

Recently, the electronic parts have been increasingly densified. When the line width decreases with the densification, even a small number of impurities can adversely affect the electronic parts. For this reason, to ensure stability, the allowable content of metal ions in the solution for manufacturing the electronic parts is required to be sufficiently low. For example, it is expected to remove metal ions to a level that is lower than the ppb levels. However, according to the conventional method, it may be difficult to appropriately reduce the content of metal ions, or a lot of working processes may lead inefficiency.

An object of the present invention is to provide a filter that can efficiently remove metal ions in a solution to be treated, and easily acquire a solution having an extremely low content of metal ions. Another object of the present invention is to provide a metal ion removing method and a metal ion removing apparatus that use the filter.

Means for Solving the Problem

One aspect of the present invention relates to a filter including a porous molding, the porous molding being a sintered product of mixed powder containing dry gel powder including an ion exchange resin and thermoplastic resin powder, or a swelled body of the sintered product. When water having an electric resistivity value of 18 M$\Omega$·cm or more is allowed to pass through the filter at a space velocity of 1200 hr$-1$, the electric resistivity value of water after passage is 15 M$\Omega$·cm or more.

Another aspect of the present invention relates to a method for removing metal ions in a solution to be treated, and the method includes a passage step of allowing the solution to be treated to pass through the above-mentioned filter.

From one aspect, the passage step may include a first passage step of allowing the solution to be treated to pass through a first filter, and a second passage step of allowing the solution to be treated subjected to the first passage step to pass through a second filter. Here, the second filter may be the filter from the above-mentioned aspect of the present invention.

From the above-mentioned aspect, the first filter may include a porous molding, the porous molding being a sintered product of mixed powder containing dry gel powder including an ion exchange resin and thermoplastic resin powder, or a swelled body of the sintered product.

Still another aspect of the present invention relates to a method for removing metal ions in a solution to be treated containing a compound having an acidic group. The removing method includes an addition step of adding a strong base to the solution to be treated, and a passage step of allowing the solution to be treated containing the added strong base to pass through the filter from the above-mentioned aspect of the present invention.

From one aspect, the compound having the acidic group may include at least one type selected from a group consisting of a phenol resin, an acrylic resin, an epoxy resin, a silicone resin, and monomers that are raw materials for these resins.

From one aspect, the equivalent ratio of the strong base to the acidic group in the solution to be treated may be 1.0×10−9 or more and 1.0×10−4 or less.

From one aspect, the passage step may include a first passage step of allowing the solution to be treated to pass through a first filter, and a second passage step of allowing the solution to be treated subjected to the first passage step to pass through a second filter. Here, the second filter may be the filter from the above-mentioned aspect of the present invention.

From the above-mentioned aspect, the first filter may include a porous molding, the porous molding being a sintered product of mixed powder containing dry gel powder including an ion exchange resin and thermoplastic resin powder, or a swelled body of the sintered product.

From the above-mentioned aspect, the ion exchange resin in the second filter may include a sulfonic group, and the ion exchange resin in the first filter may include at least one type of group selected from a group consisting of an aminophosphate group, an iminodiacetic acid group, and a tertiary amino group.

Still another aspect of the present invention relates to a metal ion removing apparatus including a first filter, and a second filter for removing metal ions from the solution to be treated that has passed through the first filter, and the second filter is the filter from the above-mentioned aspect of the present invention.

From one aspect, the first filter may include a porous molding, the porous molding being a sintered product of mixed powder containing dry gel powder including an ion exchange resin and thermoplastic resin powder, or a swelled body of the sintered product.

From the above-mentioned aspect, the ion exchange resin in the second filter may include a sulfonic group, and the ion exchange resin in the first filter may include at least one type of group selected from a group consisting of an aminophosphate group, an iminodiacetic acid group, and a tertiary amino group.

Effect of the Invention

The present invention provides a filter that can remove metal ions in a solution to be treated, thereby easily acquiring a solution having an extreme low content of metal ions. The present invention also provides a metal ion removing method and a metal ion removing apparatus that use the filter.

DESCRIPTION OF THE PREFERRED EMBODIMENTS

Figure 1:
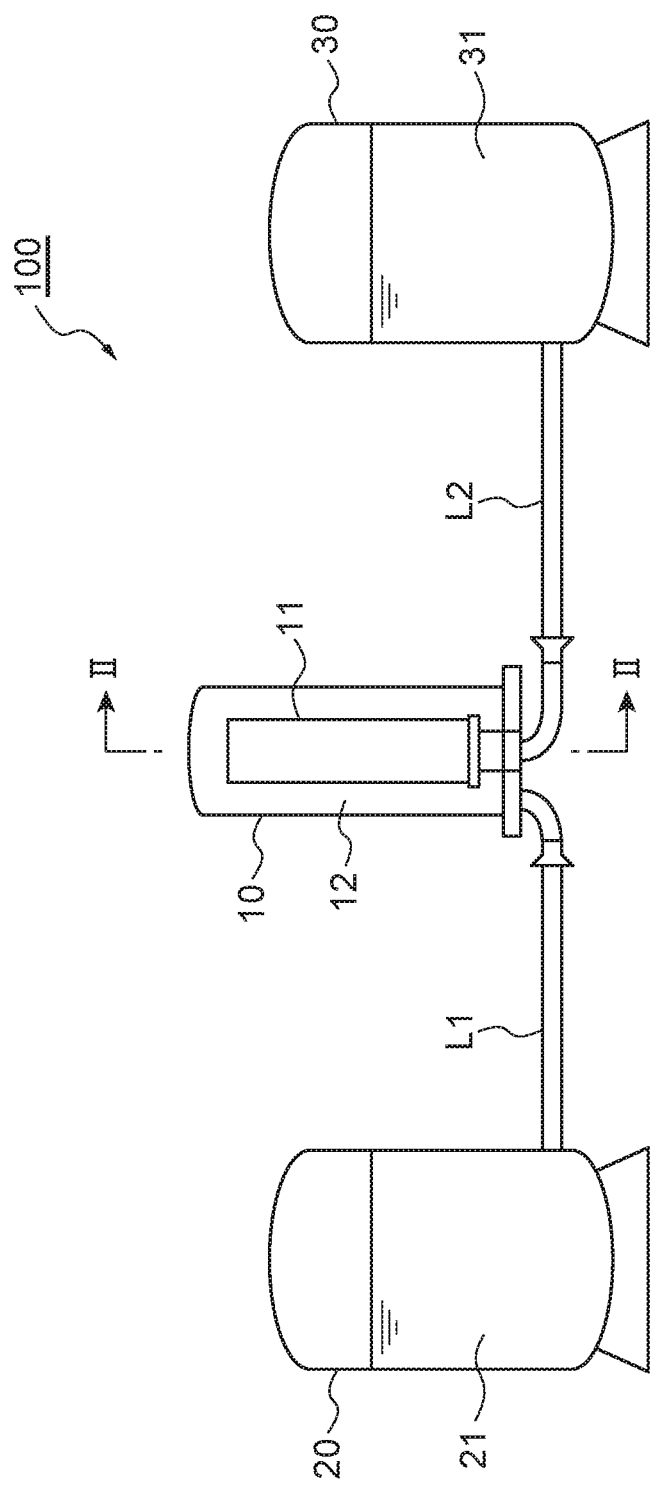
FIG. 1 is a view illustrating a metal ion removing apparatus in accordance with an embodiment.

Furthermore, preferred embodiments of the present embodiment will be described below with reference to drawings. The drawings are drawn with a portion embellished in order to ease understanding, and the dimensional ratios and the like are not limited to those shown in the drawings.

Filter

A filter in accordance with this embodiment includes a porous molding, the porous molding being a sintered product of mixed powder containing dry gel powder including an ion exchange resin and thermoplastic resin powder, or a swelled body of the sintered product.

The filter in accordance with this embodiment is characterized by that, when water having an electric resistivity value of 18 MΩ·cm or more is allowed to pass through the filter at a space velocity of 1200 hr−1, the electric resistivity value of water after passage is 15 MΩ cm or more. The electric resistivity value of water before passage is required to be 18 MΩ·cm or more, and may be about 18.23 MΩ·cm that is a theoretical threshold value. An upper limit of the electric resistivity value of water after passage is not specifically defined, and for example, may be the electric resistivity value of water before passage or less.

In this specification, the electric resistivity value of water is measured by an inline resistance sensor ERF-001-C-T manufactured by HORIBA Ltd.

The filter can remove metal ions in the solution to be treated, thereby easily acquiring a solution having an extremely low content of metal ions from the solution to be treated containing metal ions.

In this embodiment, the sintered product may have a self-supporting strength, and the thermoplastic resin powder may fix the dry gel powder. In this embodiment, since the thermoplastic resin powder fixes the dry gel powder in the sintered product, even if the size changes due to swelling of the dry gel powder, the self-supporting strength is maintained. That is, the porous molding may have the self-supporting strength in either the sintered product or swelled body.

In the case of conventional adsorbents using a gel material, the gel material may absorb water, causing a large size change and a large decrease in strength. For this reason, generally, the gel material has been held in a supporting body, or molded into beads. On the contrary, the filter in accordance with this embodiment may be a self-supporting filter as described above. In this case, metal ions can be efficiently removed while achieving space-saving.

In this embodiment, the dry gel powder only needs to absorb water and become swelled to assume a gel shape. For example, the dry gel powder can be acquired by drying hydrogel particles.

The dry gel powder includes an ion exchange resin. The ion exchange resin may be a resin having an ion exchange group or a chelate group. Examples of the ion exchange group include a sulfonic group, a carboxylic acid group, a tertiary amino group, and a quaternary ammonium group. Examples of the tertiary amino group include a dialkyl amino group (group represented as —NR12 (R1 independently denotes a substituted or unsubstituted alkyl group)), more specifically, a dimethyl amino group and a diethyl amino group. Examples of the quaternary ammonium group include a trialkyl ammonium group (group represented as —N+R23 (R2 independently denotes a substituted or unsubstituted alkyl group)), more specifically, a trimethyl ammonium group, a dimethylethyl ammonium group, and a dimethylhydroxyethyl ammonium group. Examples of the chelate group include polyamine, an aminophosphate group, an iminodiacetic acid group, a urea group, a thiol group, and a dithiocarbamic acid group.

The ion exchange resin may be a resin such as polystyrene, acryl resin, polyvinyl alcohol, cellulose, and polyamide, and these resins may be modified to have the above-mentioned ion exchange group or chelate group, and may be cross-linked by a cross-linking agent such as divinylbenzene.

The dry gel powder may contain the ion exchange resin as a main component. The main component described herein refers to the component having the content of 50 wt % or more (preferably 80 wt % or more, more preferably 90 wt % or more).

The dry gel powder may further contain an inorganic material. Examples of the inorganic material include silica gel, alumina gel, and smectite. These inorganic materials may be modified to have the above-mentioned ion exchange group or chelate group.

The percentage of water absorption of the dry gel powder is preferably 30 wt % or more, and more preferably 40 wt % or more. Thus, even if the solution to be treated contains a small amount of moisture, the moisture can be efficiently removed to remove metal ions more effectively. The percentage of water absorption of the dry gel powder is preferably 90 wt % or less, more preferably 60 wt % or less. This tends to further increase the strength of the porous molding.

In this specification, the percentage of water absorption of the dry gel powder is found according to a loss on drying method adhering to the JIS K7209:2000. More specifically, the weight (W1) of swelled gel formed by swelling the dry gel powder with a sufficient amount of water is measured. Subsequently, the swelled gel is dried under 105° C. in an oven (DRM620DB manufactured by Advantec (Bunkyo-ku, Tokyo)) for 24 hours or more, and the dry weight (W2) is measured. Then, the percentage of water absorption is found according to a below-mentioned equation (I).

$$\text{percentage of water absorption (\%)} = (W1-W2) \times 100/W1 \qquad (I)$$

An average particle diameter d1 of the dry gel powder may be, for example, 0.1 μm or more, preferably 1 μm or more. The average particle diameter d1 of the dry gel powder may be, for example, 500 μm or less, preferably 200 μm or less.

For example, the dry gel powder may be acquired by drying hydrogel particles. The drying method is not specifically limited, and examples of the drying method include hot-air drying, agitating drying, and vacuum drying.

Preferably, the percentage of water content of the dry gel powder is 10 wt % or less. The percentage of water content of the dry gel powder is preferably 10 wt % or less, more preferably 5 wt % or less.

In this specification, the percentage of water content of the dry gel powder is found according to the loss on drying method. Specifically, the weight (W3) of the dry gel powder is dried under 105° C. in an oven (DRM620DB manufactured by Advantec (Bunkyo-ku, Tokyo)) for 24 hours or more, and the dry weight (W4) is measured. Then, the percentage of water absorption is found according to a below-mentioned equation (II).

$$\text{percentage of water content (\%)} = (W3 - W4)/W3 \times 100 \quad \text{(II)}$$

In this embodiment, the thermoplastic resin powder is powder made of a resin material having a thermoplastic resin as a main component, and can partially fuse together to form a porous structure.

The content of the thermosetting resin in the thermosetting resin powder is, in terms of the entire amount of the mixed powder, preferably 80 wt % or more, more preferably 90 wt % or more, more preferably 95 wt % or more.

The thermoplastic resin powder may further contain any component other than the thermoplastic resin. Examples of the other components include a plasticizing agent such as stearate, talc, silica, and an anti-oxidizing agent.

Preferably, the thermoplastic resin powder contains at least one type selected from a group consisting of ultrahigh molecular weight polyethylene and polyamide, as the thermoplastic resin.

The weight average molecular weight of the ultrahigh molecular weight polyethylene is preferably $7.5 \times 10^5$ g/mol or more and $5 \times 10^7$ g/mol or less, more preferably $1.0 \times 10^6$ g/mol or more and $1.2 \times 10^7$ g/mol or less. The weight average molecular weight of the ultrahigh molecular weight polyethylene is measured according to a below-mentioned method.

1. "Standard Test Method for Dilute Solution Viscosity of Ethylene Polymers," D1601, Annual Book of ASTM Standards, American Society for Testing and Materials.
2. "Standard Specification for Ultra-High-Molecular-Weight Polyethylene Molding and Extrusion Materials," D4020, Annual Book of ASTM Standards, American Society for Testing and Materials The melting point of the ultrahigh molecular weight polyethylene is not specifically limited, and may be, for example, in the range of 130° C. to 135° C. The melt index of the ultrahigh molecular weight polyethylene is preferably 1.0 g/10 min or less (ASTM D1238 (ISO1133), 190° C., load of 21.6 kg), more preferably 0.5 g/10 min or less.

Semicrystalline polyamide minute particles having a melting point in the range of 150° C. to 200° C. can be suitably used as polyamide. Further, the average of the number of carbon atoms per monomer unit in such polyamide is preferably 10 or more.

The average particle diameter of the thermoplastic resin powder is not specifically limited, and may be, for example, 0.5 μm or more, or 1 μm or more. The average particle diameter of the thermoplastic resin powder may be, for example, 500 μm or less, or 100 μm or less. The gap of the porous molding tends to increase by increasing the average particle diameter of the thermoplastic resin to promote passage, and the porous molding tends to become densified by decreasing the average particle diameter of the thermoplastic resin to improve strength.

Preferably, the thermoplastic resin powder is nonspherical resin powder. For example, the thermoplastic resin powder may have a shape in which small spherical particles aggregate together like a bunch of grapes, or a plurality of protrusions are formed on a spherical particle like a pointed sugar candy ball. The nonspherical thermoplastic resin powder tends to have an improved tolerance to size change at swelling.

Preferably, the thermoplastic resin powder is porous powder. The bulk density of the porous thermoplastic resin powder may be, for example, in the range of 0.1 to 0.7 g/cm3, or in the range of 0.2 to 0.6 g/cm3. In this specification, the bulk density of the porous thermoplastic resin powder is measured according to the method adhering to the ISO60.

In this embodiment, a ratio $d2/d1$ of an average particle diameter $d2$ of the dry gel powder to the average particle diameter $d1$ of the thermoplastic resin powder is preferably 1.3 or more. A ratio $(d3-d2)/d1$ of a difference between the average particle diameter $d2$ of the dry gel powder and an average particle diameter $d3$ of the dry gel powder swelled by water absorption to the average particle diameter $d1$ of the thermoplastic resin powder is preferably 4.0 or less. This can further improve the strength of the porous molding, which is used as a self-supporting filter more suitably.

The average particle diameter $d1$ of the thermoplastic resin powder represents a value of D50, which is found according to the laser diffraction/scattering method adhering to the JIS Z8825:2013. More specifically, for the thermoplastic resin powder, the particle size distribution is found according to the laser diffraction/scattering method using Mastersizer 3000 manufactured by Malvern (the U.K., Worcester), and the D50 that results in the particle number of 50% when integrated from the smaller number is defined as the average particle diameter $d1$.

The average particle diameter $d3$ of the dry gel powder swelled by water adsorption refers to the average particle diameter of the swelled gel formed by swelling the dry gel powder with a sufficient amount of water. In this embodiment, the average particle diameter $d3$ of the swelled gel represents a value of D50, which is found according to the laser diffraction/scattering method adhering to the JIS Z8825:2013. More specifically, for the swelled gel, the particle size distribution is found according to the laser diffraction/scattering method using Mastersizer 3000 manufactured by Malvern (the U.K., Worcester), and the D50 that results in the particle number of 50% when integrated from the smaller number is defined as the average particle diameter $d3$.

In this embodiment, the average particle diameter $d2$ of the dry gel powder is found according to a below-mentioned equation (III) using the average particle diameter $d3$ of the swelled gel and a coefficient of linear expansion $\alpha$ caused by water absorption of the dry gel powder.

$$\text{average particle diameter } d2 = \text{average particle diameter } d3/(1+\text{coefficient of linear expansion } \alpha) \quad \text{(III)}$$

In this embodiment, the coefficient of linear expansion $\alpha$ caused by water absorption of the dry gel powder is found according to a following method. First, a volume (V1) of the dry gel powder and a volume (V2) of the swelled gel formed by swelling the dry gel powder with a sufficient amount of water are found based on the apparent density measured according to the method adhering to the JIS K7365:1999.

The coefficient of linear expansion α is found according to a below-mentioned equation (IV) using these volumes V1 and V2.

$$\text{coefficient of linear expansion } \alpha = ((V2/V1)^{1/3} - 1) \qquad (IV)$$

A ratio d2/d1 of the average particle diameter d2 of the dry gel powder to the average particle diameter d1 of the thermoplastic resin powder is preferably 1.3 or more, more preferably 2 or more. The ratio d2/d1 is preferably 50 or less, more preferably 25 or less. This can prevent the porous molding from becoming brittle due to size change caused by swelling, thereby easily acquiring a filter with a higher strength.

A ratio (d3-d2)/d1 of a difference between the average particle diameter d2 of the dry gel powder and the average particle diameter d3 of the dry gel powder swelled by water adsorption to the average particle diameter d1 of the thermoplastic resin powder is 4.0 or less, preferably 3.0 or less. Further, the ratio (d3-d2)/d1 is preferably 0.2 or more, more preferably 0.3 or more. This can prevent the porous molding from becoming brittle due to size change caused by swelling, thereby easily acquiring a filter with a higher strength.

In this embodiment, the porous molding is formed by sintering mixed powder containing dry gel powder and thermoplastic resin powder.

From one aspect, the porous molding can be described as a structure in which the dry gel powder is dispersed and fixed in a porous structure formed by sintering the thermoplastic resin powder. The porous molding can be described as a molding in which the dry gel powder is bound together with the thermoplastic resin powder.

The content of the dry gel powder in the mixed powder is, in the content of 100 parts by mass of the thermoplastic resin powder, preferably 10 parts by mass or more, more preferably 25 parts by mass or more. The content of the dry gel powder in the mixed powder is, in the content of 100 parts by mass of the thermoplastic resin powder, preferably 900 parts by mass or less, more preferably 300 parts by mass or less.

The mixed powder may further contain any component other than the dry gel powder and the thermoplastic resin powder as an addition agent. For example, the mixed powder may further contain activated carbon, a heavy metal decreasing medium, an arsenic removing medium, an antimicrobial medium, an ion exchange medium, iodine, resin, fiber, a gas absorbing medium, and so on. The content of such addition agent is, in terms of the entire amount of the mixed powder, 20 wt % or less, more preferably 5 wt % or less.

In this embodiment, the mixed powder is filled in a mold according to the desired shape of the porous molding, and is sintered. Sintering of the mixed powder can be performed so as to fuse the thermoplastic resin powder.

The sintering temperature may be, for example, the melting point of the thermoplastic resin in the thermoplastic resin powder or higher. The sintering temperature may be, for example, 140° C. or higher, preferably 150° C. or higher. The sintering temperature may be, for example, 200° C. or lower, or 180° C. or lower.

The sintering time is not specifically limited, and may be, for example, in the range of 5 minutes to 120 minutes, or in the range of 10 minutes to 60 minutes.

The porous molding can be molded into various shapes by appropriately selecting a mold into which the mixed powder is filled at sintering. For example, the porous molding can be molded into various shapes including disc, hollow cylinder, bell, cone, and hollow star.

The thickness of the porous molding may be, for example, 0.2 mm or more, preferably 1 mm or more, more preferably 5 mm or more. The thickness of the porous molding may be, for example, 1000 mm or less, preferably 100 mm or less.

The porous molding may be a sintered product of the mixed powder, or a swelled body formed by swelling the sintered product. For example, the sintered product may be swelled with a solvent. Examples of the solvent include water and organic solvent. In this embodiment, a polar solvent that swells the sintered product is preferably an organic solvent, more preferably PGMEA (propylene glycol 1-monomethyl ether 2-acetate), PGME (propylene glycol monomethyl ether), cyclohexane, and ethyl lactate.

The filter in accordance with this embodiment includes the porous molding. The filter in accordance with this embodiment may be a filter configured of a porous molding, and may further have another member so as to sufficiently remove metal ions.

The shape of the filter in accordance with this embodiment is not specifically limited, and may be, for example, cylinder, prism, plate, bell, sphere, semi-sphere, and rectangular parallelepiped, and they may be hollow.

The filter in accordance with this embodiment is characterized by that, as mentioned above, when water having an electric resistivity value of 18 MΩ·cm or more is allowed to pass through the filter at a space velocity of 1200 hr−1, the electric resistivity value of water after passage is 15 MΩ·cm or more.

The method for acquiring such filter is not specifically limited, and for example, a cleaning liquid is circulated in the porous molding to clean the porous molding. Examples of the cleaning liquid include water, an organic solvent, an acidic solution, a basic solution, and a mixed solution of them. The cleaning condition is not specifically limited. For example, the flow rate at cleaning may be in the range of 10 mL/min to 10 L/min, and the space velocity at cleaning may be in the range of 6 to 6000 hr−1. The temperature of the cleaning liquid at cleaning may be, for example, in the range of 1° C. to 99° C.

Metal Ion Removing Method

The metal ion removing method in accordance with this embodiment is a method for removing metal ions in a solution to be treated, and has a passage step of allowing the solution to be treated to pass through the above-mentioned filter.

According to the removing method in accordance with this embodiment, metal ions (in particular, Na ions, Fe ions, K ions, Ca ions, Co ions, Cr ions, and Ni ions) can be efficiently removed and thus, a liquid having an extremely low content of metal ions (for example, a liquid having the content of each type of metal ions is 500 ppt or less, more preferably 150 ppt or less, more preferably 100 ppt or less) can be acquired.

In this embodiment, the content of metal ions in the solution to be treated is not specifically limited. For example, the content of metal ions in the solution to be treated may be 1 ppb or more, or 100 ppb or more. An upper limit of the content of metal ions in the solution to be treated is not specifically limited, and may be, for example, 100 ppm or less, or 1000 ppb or less.

The solution to be treated may be an aqueous solvent such as water, an organic solvent such as PGMEA, or mixed solution thereof.

Conditions of passing the solution to be treated are not specifically limited. For example, the space velocity (SV) may be in the range of 6 to 200 hr−1. The primary pressure may be, for example, in the range of 20 to 300 kPa.

The solution to be treated may further contain an organic compound. That is, in this embodiment, metal ions can be removed from a solution formed by dissolving the organic compound in the solvent. In this embodiment, an additive may be added to the solution to be treated and then, metal ions may be removed.

From one preferred aspect, the removing method may be a method for removing metal ions in a solution to be treated containing a compound having an acidic group. Here, the removing method may include an addition step of adding a strong base to the solution to be treated, and a passage step of allowing the solution to be treated containing the added strong base to pass through the filter in accordance with the embodiment.

From the above aspect, by performing the addition step, metal ions can be removed from the solution to be treated containing the compound having the acidic group more greatly.

The compound having the acidic group may be a low molecular compound or a high molecular compound. Examples of the acidic group include a phenolic hydroxyl group, a carboxyl group, a sulfone group, and a nitric acid group. Among these groups, the phenolic hydroxyl group is the most preferable since it works well in the addition step.

For example, the compound having the acidic group may include at least one type selected from a group consisting of a phenol resin, an acrylic resin, an epoxy resin, a silicone resin, and monomers that are raw materials for these resins. The compound having the acidic group preferably includes the phenol resin since it works more remarkably in the addition step.

The strong base used in the addition step is not specifically limited. Examples of the strong base include metal hydroxide such as sodium hydroxide, and tetramethyl ammonium hydroxide.

The equivalent ratio of the strong base to the acidic group in the solution to be treated is preferably $1.0 \times 10^{-9}$ or more, more preferably $1.0 \times 10^{-8}$ or more. The equivalent ratio is preferably $1.0 \times 10^{-4}$ or less, more preferably $1.0 \times 10^{-5}$ or less. This can further remove metal ions in the passage step.

In this embodiment, the solution to be treated may pass through another filter. That is, the passage step may include a first passage step of allowing the solution to be treated to pass through a first filter, and a second passage step of allowing the solution to be treated subjected to the first passage step to pass through a second filter. Here, the above-mentioned filter is used as the second filter, and the first filter is not specifically limited.

From a preferred aspect, the first filter may include a porous molding, the porous molding being a sintered product of mixed powder containing dry gel powder including an ion exchange resin and thermoplastic resin powder, or a swelled body of the sintered product.

The first filter from this aspect may be exemplified by the same filter as the filter in accordance with the above embodiment. However, the first filter is not necessarily configured such that, when water having an electric resistivity value of 18 M$\Omega$·cm or more is allowed to pass through the filter at a space velocity 1200 hr-1, the electric resistivity value of water after passage is 15 M$\Omega$·cm or more.

From this aspect, preferably, the ion exchange resin in the second filter (that is, the filter in accordance with the above embodiment) includes a sulfonic group, and the ion exchange resin in the first filter include at least one type of group selected from a group consisting of an aminophosphate group, an iminodiacetic acid group, and a tertiary amino group. In such combination of the first filter and the second filter, for example, even if Na ions elute when the first filter removes Fe ions, the second filter can remove the eluted Na ions, remarkably reducing the content of metal ions.

Metal Ion Removing Apparatus

A metal ion removing apparatus in accordance with this embodiment includes a removing section having the filter in accordance with the above-mentioned embodiment.

Figure 2:
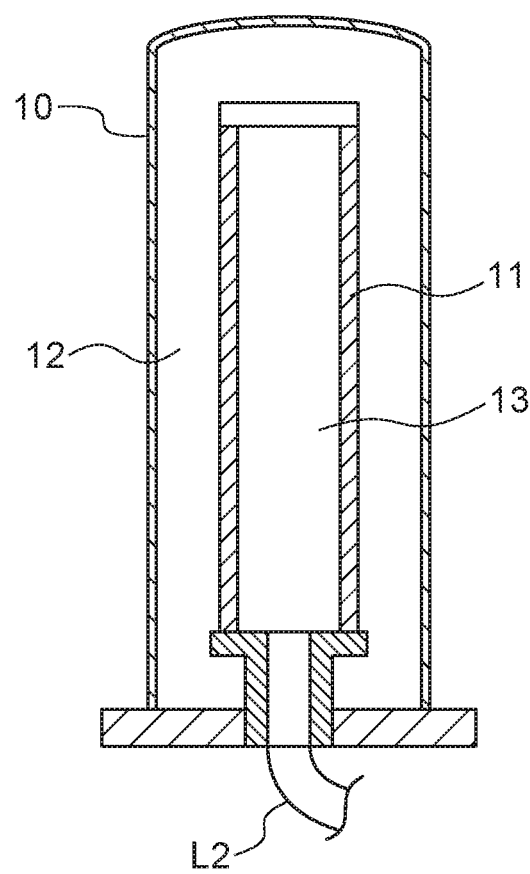
FIG. 2 is a cross sectional view along the line II-II illustrated in FIG. 1.

FIG. 1 is a view for describing the metal ion removing apparatus in accordance with a preferred embodiment, and FIG. 2 is a cross sectional view taken along the line II-II in FIG. 1. The metal ion removing apparatus 100 illustrated in FIG. 1 includes a removing section 10 having a filter 11 in accordance with the above-mentioned embodiment, a first tank 20 for storing a solution to be treated 21, and a second tank 30 for storing liquid 31 with metal ions removed. The removing section 10 is divided into a first area 12 and a second area 13 by the filter 11.

The first tank 20 is coupled to the removing section 10 via a first line L1, the solution to be treated 21 in the first tank 20 is sent to the first area 12 of the removing section 10 through the first line L1. The solution to be treated 21 sent to the first area 12 moves to the second area 13 through the filter 11. At this time, metal ions in the solution to be treated 21 are removed by the filter 11. The second tank 30 is coupled to the removing section 10 via a second line L2, and the solution to be treated (liquid 31) passing through the filter 11 is sent from the second area 13 to the second tank 30 through the second line L2.

Figure 3:
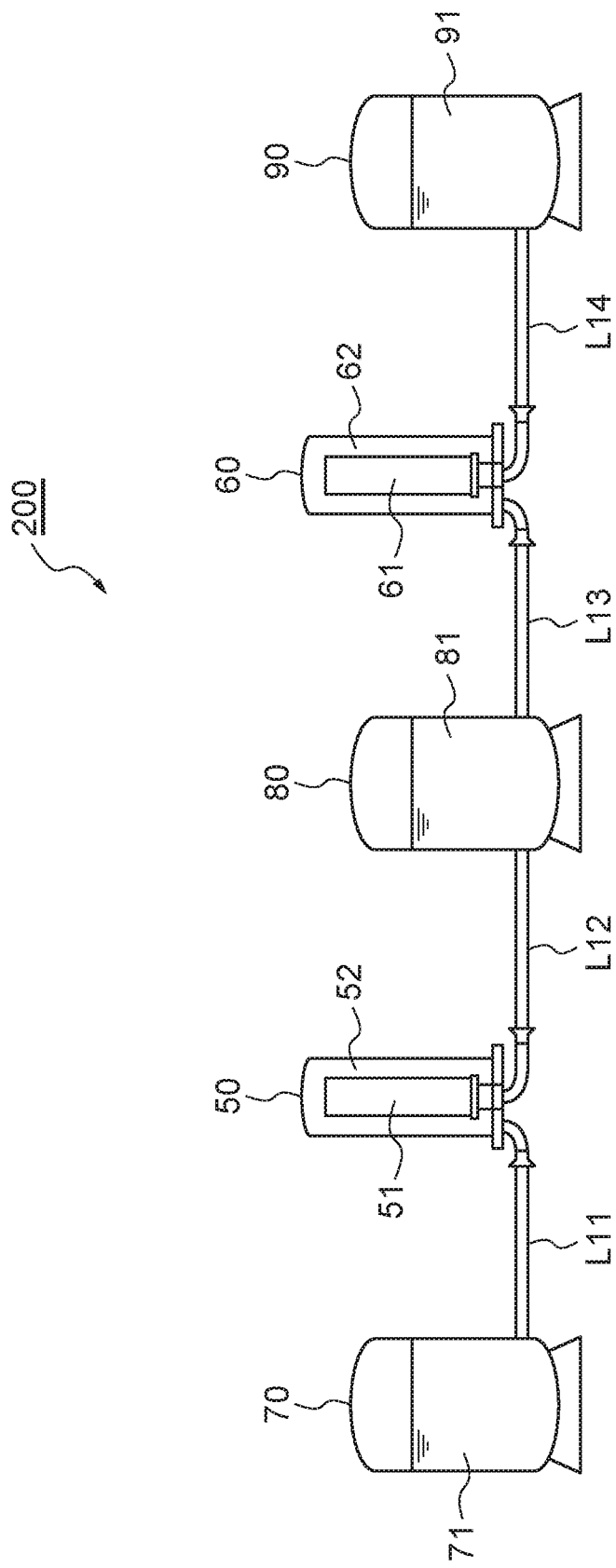
FIG. 3 is a view illustrating a metal ion removing apparatus in accordance with another embodiment

FIG. 3 is a view for describing a metal ion removing apparatus in accordance with another preferred embodiment. The metal ion removing apparatus 200 illustrated in FIG. 3 includes a first removing section 50 having a first filter 51, a second removing section 60 having a second filter 61, a first tank 70 for storing a solution to be treated 71, a second tank 80 for storing an intermediate liquid 81 passing through the first filter 51, and a third tank 90 for storing a liquid 91 passing through the second filter 61 with metal ions removed. The second filter 61 is the filter in accordance with the above-mentioned embodiment.

The first tank 70 is coupled to the first removing section 50 via a first line L11. The solution to be treated 71 in the first tank 70 is sent to the first removing section 50 through the first line L11. The solution to be treated 71 sent to the first removing section 50 is allowed to pass through the first filter 51. The first removing section 50 is coupled to the second tank 80 via a second line L12. The intermediate liquid 81 passing through the first filter 51 is sent to the second tank 80 through the second line L12.

The second tank 80 is coupled to the second removing section 60 via a third line L13. The intermediate liquid 81 in the second tank 80 is sent to the second removing section 60 through the third line L13. The intermediate liquid 81 sent to the second removing section 60 is allowed to pass through the second filter 61. The second removing section 60 is coupled to the third tank 90 via a fourth line L14. The liquid 91 that has passed through the second filter 61, with metal ions removed, is sent to the third tank 90 through the fourth line L14.

From a preferred aspect, the first filter 51 may include a porous molding, the porous molding being a sintered product of mixed powder containing dry gel powder including an ion exchange resin and thermoplastic resin powder, or a swelled body of the sintered product.

The first filter 51 from this aspect may be exemplified by the same filter as the filter in accordance with the above embodiment. However, the first filter 51 is not necessarily configured such that, when water having an electric resistivity value of 18 MΩ·cm or more is allowed to pass through the filter at a space velocity 1200 hr−1, the electric resistivity value of water after passage is 15 MΩ·cm or more.

From this aspect, preferably, the ion exchange resin in the second filter 61 (that is, the filter in accordance with the above embodiment) includes a sulfonic group, and the ion exchange resin in the first filter 51 include at least one type of group selected from a group consisting of an aminophosphate group, an iminodiacetic acid group, and a tertiary amino group. In such combination of the first filter 51 and the second filter 61, for example, even if the solution to be treated contains a plurality of types metal ions (for example, iron ions and sodium ions), each type of metal ions can be remarkably reduced.

Although descriptions were given above for the preferred embodiments of the present invention, the present invention is not limited to the aforementioned embodiments.

EXAMPLES

The present invention will be described more specifically below using examples, but the present invention is not intended to be limited to the examples.

Example A-1 Dry Gel Powder A-1

Strong acid cation exchange resin particles having a sulfonic group were dried in an oven (DRM620DB manufactured by Advantec Ltd. (Bunkyo-ku, Tokyo)) under 110° C. for 36 hours or more to acquire dry gel powder having an average particle diameter of 440 μm. Subsequently, the dry gel powder is ground to prepare dry gel powder A-1 having an average particle diameter d2 of 90 μm.

Thermoplastic Resin Powder A-1

Trade name "GUR2126" (ultrahigh molecular weight polyethylene powder, weight average molecular weight: about 4.5×106 g/mol, average particle diameter d1: 32 μm) manufactured by Celanese Corporation (Oberhausen, Germany) was used as thermoplastic resin powder.

Fabrication of Filter

The dry gel powder A-1 (50 parts by mass) and the thermoplastic resin powder A-1 (50 parts by mass) were mixed, and the mixture was filled in a mold and heated under 160° C. in an oven for 10 minutes to fabricate a hollow cylindrical filter having an outer diameter of about 60 mm, an inner diameter of about 28 mm, and a length of about 250 mm. One opening of the fabricated filter was closed such that a solution to be treated flows from the outside to the inside of the filter. The fabricated filter was treated using a cleaning liquid for 48 hours or more to acquire a filter A-1 in Example A-1.

When water having an electric resistivity value of 18 MΩ·cm was allowed to pass through the acquired filter A-1 at a space velocity of 1200 hr−1, the electric resistivity value of water after passage passed through the filter became 17.6 MΩ·cm.

Example A-2 Dry Gel Powder A-2

Chelate resin particles having an aminophosphate group were dried in an oven (DRM620DB manufactured by Advantec Ltd. (Bunkyo-ku, Tokyo)) under 110° C. for 36 hours or more to acquire dry gel powder having an average particle diameter of 440 μm. Subsequently, the dry gel powder is ground to prepare dry gel powder A-2 having an average particle diameter d2 of 90 μm.

Fabrication of Filter

A filter A-2 was fabricated similar to Example A-1, except that the dry gel powder A-2 were used in place of the dry gel powder A-1.

When water having an electric resistivity value of 18 MΩ·cm was allowed to pass through the acquired filter A-2 at a space velocity of 1200 hr−1, the electric resistivity value of water after passage passed through the filter became 15.5 MΩ·cm.

Example A-3

A filter A-3 was fabricated similar to Example A-2, except that the period of the treatment using the cleaning liquid was extended to 72 hours or more.

When water having an electric resistivity value of 18 MΩ·cm was allowed to pass through the acquired filter A-3 at a space velocity of 1200 hr−1, the electric resistivity value of water after passage passed through the filter became 16.4 MΩ·cm.

Comparative Example X-1

A filter X-1 was fabricated similar to Example A-1, except that the period of the treatment using the cleaning liquid was shortened to 24 hours or less.

When water having an electric resistivity value of 18 MΩ·cm was allowed to pass through the acquired filter X-1 at a space velocity of 1200 hr−1, the electric resistivity value of water after passage passed through the filter became 13.6 MΩ·cm.

Comparative Example X-2

A filter X-2 was fabricated similar to Example A-2, except that the period of the treatment using the cleaning liquid was shortened to 24 hours or less.

When water having an electric resistivity value of 18 MΩ·cm was allowed to pass through the acquired filter X-2 at a space velocity of 1200 hr−1, the electric resistivity value of water after passage passed through the filter became 12.8 MΩ·cm.

Comparative Example X-3

A filter X-3 was fabricated similar to Example A-2, except that the treatment using the cleaning liquid was not performed.

When water having an electric resistivity value of 18 MΩ·cm was allowed to pass through the acquired filter X-3 at a space velocity of 1200 hr−1, the electric resistivity value of water after passage passed through the filter became 0.03 MΩ·cm.

Passage Test A-1 (Passage Test of PGMEA)

PGMEA (propylene glycol 1-monomethyl ether 2-acetate) was allowed to pass through the filters acquired in the above-mentioned examples and comparative examples under conditions of a primary pressure of 50 kPa and a flow rate of 100 ml/min. The content of sodium ions and the content of iron ions in the PGMEA were measured before and after the passage. Results are illustrated in Table 1.

Passage Test A-2 (Passage Test of Phenol Resin-Containing Solution)

A PGMEA solution containing a phenol resin (SP1006N manufactured by Asahi Yukizai Corporation) by 5 wt % was allowed to pass through the acquired filter acquired in the above-mentioned examples and comparative examples under conditions of a primary pressure of 50 kPa and a flow rate of 100 ml/min. The content of sodium ions and the content of iron ions in the solution were measured before and after the passage. The results are illustrated in Table 1.

Fabrication of Second Filter B-1-2

The dry gel powder B-1-2 (40 parts by mass) and the thermoplastic resin powder B-1 (60 parts by mass) were mixed. The mixture was filled in a mold, and heated under

TABLE 1

| Functional group | | Example A-1 Sulfonic group | Example A-2 Amino-phosphate group | Example A-3 Amino-phosphate group | Comparative Example X-1 Sulfonic group | Comparative Example X-2 Amino-phosphate-group | Comparative Example X-3 Amino-phosphate group |
|---|---|---|---|---|---|---|---|
| Electric resistivity value (MΩ · cm) | | 17.6 | 15.5 | 16.4 | 13.6 | 12.8 | 0.03 |
| Passage test A-1 | | | | | | | |
| Na amount (ppt) | Before passage | 58 | 32 | 43 | 110 | 58 | 36 |
| | After passage | 6 | 28 | 2 | 250 | 75 | 300 |
| | Removal ratio | 90% | 13% | 95% | −130% | −29% | −730% |
| Fe amount (ppt) | Before passage | 45 | 5 | 149 | 86 | 45 | 97 |
| | After passage | 29 | 0 | 3 | 18 | 40 | 58 |
| | Removal ratio | 36% | 100% | 98% | 79% | 11% | 40% |
| Passage test A-2 | | | | | | | |
| Na amount (ppt) | Before passage | 495 | 730 | 550 | 128 | — | 730 |
| | After passage | 22 | 30 | 34 | 141 | — | 5450 |
| | Removal ratio | 96% | 96% | 94% | −10% | — | −650% |
| Fe amount (ppt) | Before passage | 196 | 180 | 165 | 37 | — | 180 |
| | After passage | 155 | 150 | 44 | 28 | — | 70 |
| | Removal ratio | 20% | 16% | 73% | 24% | — | 61% |

Example B-1 Dry Gel Powder B-1-1

Dry gel powder having an average particle diameter d2 of 90 μm were fabricated similar to Example A-2, and the dry gel powder was defined as dry gel powder B-1-1.

Thermoplastic Resin Powder B-1

Trade name "GUR2126" (ultrahigh molecular weight polyethylene powder, weight average molecular weight: about 4.5×106 g/mol, average particle diameter d1: 32 μm) manufactured by Celanese Corporation (Oberhausen, Germany) was used as thermoplastic resin powder.

Fabrication of First Filter B-1-1

The dry gel powder B-1-1 (40 parts by mass) and the thermoplastic resin powder B-1 (60 parts by mass) were mixed. The mixture was filled in a mold, and heated under 160° C. in an oven for 10 minutes to fabricate a disc-like filter having a diameter of about 47 mm and a thickness of about 5 mm. The fabricated filter caused the solution to be treated to flow from the upper side to the lower side of the filter. This filter was defined as a first filter B-1-1.

When water having an electric resistivity value of 18 MΩ ·cm was allowed to pass through the acquired first filter B-1-1 at a space velocity of 1200 hr−1, the electric resistivity value of water after passage passed through the filter became 0.4 MΩ ·cm.

Dry Gel Powder B-1-2

Dry gel powder having an average particle diameter d2 of 90 μm were fabricated similar to Example A-1, and the dry gel powder was defined as dry gel powder B-1-2.

160° C. in an oven for 10 minutes to fabricate a disc-like filter having a diameter of about 47 mm and a thickness of about 5 mm. The fabricated filter caused the solution to be treated to flow the upper side to the lower side of the filter. The fabricated filter was treated using a cleaning liquid for 48 hours or more to acquire a second filter B-1-2.

Water having an electric resistivity value of 18 MΩ ·cm was allowed to pass through the acquired second filter B-1-2 at a space velocity of 1200 hr−1, the electric resistivity value of water after passage passed through the filter was 17.6 MΩ ·cm.

Fabrication of Metal Ion Removing Apparatus

The first filter B-1-1 and the second filter B-1-2 were coupled to each other such that the solution to be treated passed through the filters in this order to fabricate a metal ion removing apparatus.

Example B-2 Dry Gel Powder B-2-1

Chelate resin particles having an iminodiacetic acid group were dried under 110° C. in an oven (DRM620DB manufactured by Advantec (Bunkyo-ku, Tokyo)) for 36 hours or more to acquire dry gel powder having an average particle diameter of 440 μm. Subsequently, the dry gel powder was ground to prepare dry gel powder B-2-1 having an average particle diameter d2 of 90 μm.

Fabrication of First Filter B-2-1

A first filter was fabricated similar to <Fabrication of first filter B-1-1> in Example B-1, except that the dry gel powder B-2-1 were used in place of the dry gel powder B-1-1, to acquire a first filter B-2-1.

Water having an electric resistivity value of 18 MΩ·cm was allowed to pass through the acquired first filter B-2-1 at a space velocity of 1200 hr−1, the electric resistivity value of water after passage passed through the filter was 0.1 MΩ·cm.

Fabrication of Metal Ion Removing Apparatus

A metal ion removing apparatus was fabricated similar to Example B-1, except that the first filter B-1-1 was changed to the first filter B-2-1.

Example B-3 Dry Gel Powder B-3-1

Weak basic ion exchange resin particles having a tertiary amine group were dried under 110° C. in an oven (DRM620DB manufactured by Advantec (Bunkyo-ku, Tokyo)) for 36 hours or more, to acquire dry gel powder having an average particle diameter of 440 μm. Subsequently, the dry gel powder was ground to prepare dry gel powder B-3-1 having an average particle diameter d2 of 90 μm.

Fabrication of First Filter B-3-1

A first filter was fabricated similar to Fabrication of first filter B-1-1 in Example B-1, except that the dry gel powder B-3-1 were used in place of the dry gel powder B-1-1, to acquire a first filter B-3-1.

Water having an electric resistivity value of 18 MΩ·cm was allowed to pass through the acquired first filter B-3-1 at a space velocity of 1200 hr−1, the electric resistivity value of water after passage passed through the filter was 3.7 MΩ·cm.

Fabrication of Metal Ion Removing Apparatus

A metal ion removing apparatus was fabricated similar to Example B-1, except that the first filter B-1-1 was changed to the first filter B-3-1.

Comparative Example Y-1

A metal ion removing apparatus was fabricated using only the first filter B-2-1 fabricated in Example B-2.

Comparative Example Y-2

A metal ion removing apparatus was fabricated using only the first filter B-3-1 fabricated in Example B-3.

Passage Test B-1 (Passage Test of Phenol Resin-Containing Solution)

A PGMEA solution containing a phenol resin (SP1006N manufactured by Asahi Yukizai Corporation) by 5 wt % was supplied to the acquired the metal ion removing apparatuses acquired in the above-mentioned examples and comparative examples, allowing the PGMEA solution to pass through the first filter and the second filter (only the first filter in the comparative examples). The content of sodium ions and the content of iron ions were measured before and after the passage. Results are illustrated in Table 2.

TABLE 2

| | | Example B-1 | Example B-2 | Example B-3 | Comparative Example Y-1 | Comparative Example Y-2 |
|---|---|---|---|---|---|---|
| First filter | | Amino-phosphate group | Iminodiacetic acid group | Tertiary amino group | Iminodiacetic acid group | Tertiary amino group |
| Electric resistivity value (MΩ · cm) | | 0.4 | 0.1 | 3.7 | 0.1 | 3.7 |
| Second filter | | Sulfonic group | Sulfonic group | Sulfonic group | — | — |
| Electric resistivity value (MΩ · cm) | | 17.6 | 17.6 | 17.6 | — | — |
| Passage test A-1 | | | | | | |
| Na amount (ppt) | Before passage | 731 | 250 | 250 | 250 | 250 |
| | After passage | 26 | 5 | 3 | 55000 | 530 |
| | Removal ratio | 96% | 98% | 99% | −22000% | −110% |
| Fe amount (ppt) | Before passage | 180 | 450 | 450 | 450 | 450 |
| | After passage | 43 | 190 | 210 | 50 | 330 |
| | Removal ratio | 76% | 58% | 53% | 89% | 27% |

Example C-1 Fabrication of Filter C-1

A filter was fabricated similar to Example A-2, and the filter was defined as a filter C-1.

Removal of Metal Ions

A PGMEA solution containing a phenol resin (SP1006N manufactured by Asahi Yukizai Corporation) by 10 wt % was prepared. In addition, an aqueous solution containing sodium hydroxide by 10 wt % was prepared, to prepare an IPA (isopropanol) solution containing sodium hydroxide by 1000 ppm from the aqueous solution. 0.01 parts by mass of the IPA solution was added to 100 parts by mass of the PGMEA solution, to prepare a solution to be treated containing sodium hydroxide by 0.1 ppm. The acquired solution to be treated was allowed to pass through the filter C-1 under conditions of a primary pressure of 50 kPa and a flow rate of 20 ml/min, and the content of sodium ions and the content of iron ions were measured before and after the passage. Results are illustrated in Table 3.

Example C-2 Removal of Metal Ions

A PGMEA solution containing a phenol resin (SP1006N manufactured by Asahi Yukizai Corporation) by 10 wt % was prepared. In addition, an aqueous solution containing tetramethyl ammonium hydroxide (TMAH) by 10 wt % was prepared, to prepare an IPA solution containing TMAH by 1000 ppm from the aqueous solution. 0.01 parts by mass of the IPA solution was added to 100 parts by mass of the PGMEA solution, to prepare a solution to be treated containing TMAH by 1000 ppm. The acquired solution to be treated was allowed to pass through the filter C-1 under conditions of a primary pressure of 50 kPa and a flow rate of 20 ml/min, and the content of sodium ions and the content of iron ions were measured before and after the passage. Results are illustrated in Table 3.

Reference Example 1 Removal of Metal Ions

A PGMEA solution containing a phenol resin (SP1006N manufactured by Asahi Yukizai Corporation) by 10 wt % was prepared. The PGMEA solution was allowed to pass through the filter C-1 under conditions of a primary pressure of 50 kPa and a flow rate of 20 ml/min, and the content of sodium ions and the content of iron ions were measured before and after the passage. Results are illustrated in Table 3.

TABLE 3

| | | Example C-1 | Example C-2 | Reference Example 1 |
|---|---|---|---|---|
| Additive | | NaOH | TMAH | — |
| Na amount (ppt) | Before passage | 74570 | 100 | 730 |
| | After passage | 150 | 60 | 30 |
| Fe amount (ppt) | Before passage | 140 | 130 | 180 |
| | After passage | 50 | 70 | 150 |

REFERENCE NUMERALS

10 Removing section,
11 Filter,
20 First tank,
30 Second tank,
100 Metal ion removing apparatus,
50 First removing section,
51 First filter,
60 Second removing section,
61 Second filter,
70 First tank,
80 Second tank,
90 Third tank,
200 Metal ion removing apparatus.

The invention claimed is:

1. A method for removing metal ions in a solution to be treated containing a compound having an acidic group, the method comprising:
    an addition step of adding a strong base to the solution to be treated; and
    a passage step of allowing the solution to be treated with the added strong base to pass through a filter comprising a porous molding, the porous molding being a sintered product of mixed powder containing dry gel powder including an ion exchange resin and thermoplastic resin powder, or a swelled body of the sintered product, and when water having an electric resistivity value of 18 MΩ·cm or more is allowed to pass through the filter at a space velocity of 1200 hr−1, the electric resistivity value of water after passage is 15 MΩ·cm or more.

2. The removing method according to claim 1, wherein the compound having the acidic group includes at least one type selected from a group consisting of a phenol resin, an acrylic resin, an epoxy resin, a silicone resin, and monomers that are raw materials for these resins.

3. The removing method according to claim 1, wherein an equivalent ratio of the strong base to the acidic group in the solution to be treated is $1.0 \times 10^{-9}$ or more and $1.0 \times 10^{-4}$ or less.

4. The removing method according to claim 1, wherein the passage step includes:
    a first passage step of allowing the solution to be treated to pass through a first filter; and
    a second passage step of allowing the solution to be treated subjected to the first passage step to pass through a second filter, and the second filter comprises a porous molding, the porous molding being a sintered product of mixed powder containing dry gel powder including an ion exchange resin and thermoplastic resin powder, or a swelled body of the sintered product, and when water having an electric resistivity value of 18 MΩ·cm or more is allowed to pass through the second filter at a space velocity of 1200 hr−1, the electric resistivity value of water after passage is 15 MΩ·cm or more.

5. The removing method according to claim 4, wherein the first filter includes a porous molding, the porous molding being a sintered product of mixed powder containing dry gel powder including an ion exchange resin and thermoplastic resin powder, or a swelled body of the sintered product.

6. The removing method according to claim 5, wherein
    the ion exchange resin in the second filter includes a sulfonic group, and
    the ion exchange resin in the first filter includes at least one type of group selected from a group consisting of an aminophosphate group, an iminodiacetic acid group, and a tertiary amino group.

7. A metal ion removing apparatus comprising:
    a first filter comprising a porous molding, the porous molding being a sintered product of mixed powder containing dry gel powder including an ion exchange resin including at least one type of group selected from a group consisting of an aminophosphate group, an iminodiacetic acid group, and a tertiary amino group and thermoplastic resin powder, or a swelled body of the sintered product; and a second filter for removing metal ions from solution to be treated that has passed through the first filter, the second filter comprising a porous molding, the porous molding being a sintered product of mixed powder containing dry gel powder including an ion exchange resin including a sulfonic group and thermoplastic resin powder, or a swelled body of the sintered product, and when water having an electric resistivity value of 18 MΩ·cm or more is allowed to pass through the filter at a space velocity of 1200 hr−1, the electric resistivity value of water after passage is 15 MΩ·cm or more.

* * * * *